US011950310B2

United States Patent
Saber et al.

(10) Patent No.: US 11,950,310 B2
(45) Date of Patent: Apr. 2, 2024

(54) METHOD AND DEVICE FOR MULTIPLE TRANSMISSION AND RECEPTION POINTS BEAM FAILURE RECOVERY

(71) Applicant: Samsung Electronics Co., Ltd., Suwon-si (KR)

(72) Inventors: Hamid Saber, San Diego, CA (US); Jung Hyun Bae, San Diego, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 238 days.

(21) Appl. No.: 17/491,202

(22) Filed: Sep. 30, 2021

(65) Prior Publication Data

US 2022/0117024 A1 Apr. 14, 2022

Related U.S. Application Data

(60) Provisional application No. 63/222,707, filed on Jul. 16, 2021, provisional application No. 63/090,329, filed on Oct. 12, 2020.

(51) Int. Cl.
*H04W 76/19* (2018.01)
*H04L 5/00* (2006.01)
*H04W 72/21* (2023.01)

(52) U.S. Cl.
CPC .......... *H04W 76/19* (2018.02); *H04L 5/0048* (2013.01); *H04W 72/21* (2023.01)

(58) Field of Classification Search
CPC ...... H04W 76/19; H04W 72/21; H04L 5/0048
See application file for complete search history.

(56) References Cited

U.S. PATENT DOCUMENTS 10,485,054 B2 11/2019 Tenny et al.
10,911,201 B2 2/2021 Cheng
11,038,570 B2 6/2021 Grant et al.
(Continued)

FOREIGN PATENT DOCUMENTS

WO WO 2020/048443 A1 3/2020
WO WO 2020/057665 A1 3/2020

OTHER PUBLICATIONS

EPO Extended European Search Report dated Mar. 14, 2022, issued in corresponding European Patent Application No. 21200678.7 (10 pages).

*Primary Examiner* — Basil Ma
(74) *Attorney, Agent, or Firm* — Lewis Roca Rothgerber Christie LLP (57) ABSTRACT

A method of implementing beam failure recovery for a multi-transmission-and-reception-point (M-TRP) transmission including a first transmission from a first TRP and a second transmission from a second TRP may include: receiving a first set of reference signals (RSs) corresponding to the first TRP and a second set of RSs corresponding to the second TRP; determining that the first set of RSs indicates a beam failure instance (BFI) specific to the first TRP, and responsively updating a first BFI counter specific to the first TRP; determining that a beam failure with respect to the first TRP has occurred based on a count of the first BFI counter equaling or surpassing a first BFI counter threshold; and performing a BFR process for the first TRP responsive to determining that the beam failure with respect to the first TRP has occurred.

20 Claims, 5 Drawing Sheets

(56) References Cited

U.S. PATENT DOCUMENTS

| | | |
|---|---|---|
| 2018/0192384 A1 | 7/2018 | Chou et al. |
| 2020/0145280 A1 | 5/2020 | Cirik et al. |
| 2021/0084655 A1 | 3/2021 | Estevez et al. |
| 2021/0376906 A1* | 12/2021 | Khojastepour ...... H04B 7/0408 |
| 2022/0103232 A1* | 3/2022 | Zhou ..................... H04W 76/19 |
| 2022/0104038 A1* | 3/2022 | Zhou .................. H04W 72/046 |

* cited by examiner

METHOD AND DEVICE FOR MULTIPLE TRANSMISSION AND RECEPTION POINTS BEAM FAILURE RECOVERY

CROSS-REFERENCE TO RELATED APPLICATIONS

This application is based on and claims priority under 35 U.S.C. § 119(e) to U.S. Provisional Patent Application No. 63/090,329 filed on Oct. 12, 2020, and U.S. Provisional Patent Application No. 63/222,707 filed on Jul. 16, 2021, the contents of which are incorporated herein by reference.

FIELD

The present disclosure relates generally to communication schemes and protocols, including communications involving multiple transmission and reception points (M-TRPs), and beam failure detection and beam failure recovery thereof.

BACKGROUND

Certain communications between network systems and devices (also referred to as user equipments (UEs)) performed according to the $3^{rd}$ Generation Partnership Project (3GPP) Fifth Generation (5G) or New Radio (NR) cellular communication standard involve transmissions from the network system over beams from different TRPs (e.g., different physical antennas or different antenna ports (e.g., on a same antenna)). The beams may be combined at or by a receiving UE. Such "M-TRP" transmissions may involve processing for beam failure detection and/or for beam failure recovery (BFR).

SUMMARY

According to some embodiments, a method of implementing beam failure recovery for an M-TRP transmission including a first transmission from a first TRP and a second transmission from a second TRP may include: receiving a first set of reference signals (RSs) corresponding to the first TRP and a second set of RSs corresponding to the second TRP; determining that the first set of RSs indicates a beam failure instance (BFI) specific to the first TRP, and responsively updating a first BFI counter specific to the first TRP; determining that a beam failure with respect to the first TRP has occurred based on a count of the first BFI counter equaling or surpassing a first BFI counter threshold; and performing a BFR process for the first TRP responsive to determining that the beam failure with respect to the first TRP has occurred.

According to some embodiments, a system includes a UE that includes a processing circuit. The processing circuit is configured to implement a method of BFR for an M-TRP transmission that includes a first transmission from a first TRP and a second transmission from a second TRP. The method includes: receiving a first set of RSs corresponding to the first TRP and a second set of RSs corresponding to the second TRP; determining that the first set of RSs indicates a BFI specific to the first TRP, and responsively updating a first BFI counter specific to the first TRP; determining that a beam failure with respect to the first TRP has occurred based on a count of the first BFI counter equaling or surpassing a first BFI counter threshold; and performing a BFR process for the first TRP responsive to determining that the beam failure with respect to the first TRP has occurred.

BRIEF DESCRIPTION OF THE DRAWINGS

Certain aspects, features, and advantages of certain embodiments of the present disclosure will be readily apparent from the following detailed description and the accompanying drawings, in which.

DETAILED DESCRIPTION

Certain embodiments described herein provide for improved beam failure detection and/or beam failure recovery for M-TRP transmissions. Such improvements may provide for, among other things, detecting and reporting beam failure upon failure of one of the TRP's beam(s), and implementing an appropriate BFR procedure. This can, for example, prevent a network from implementing scheduling dependent on the failed TRP, which may in turn improve the network's data throughput.

Figure 1:
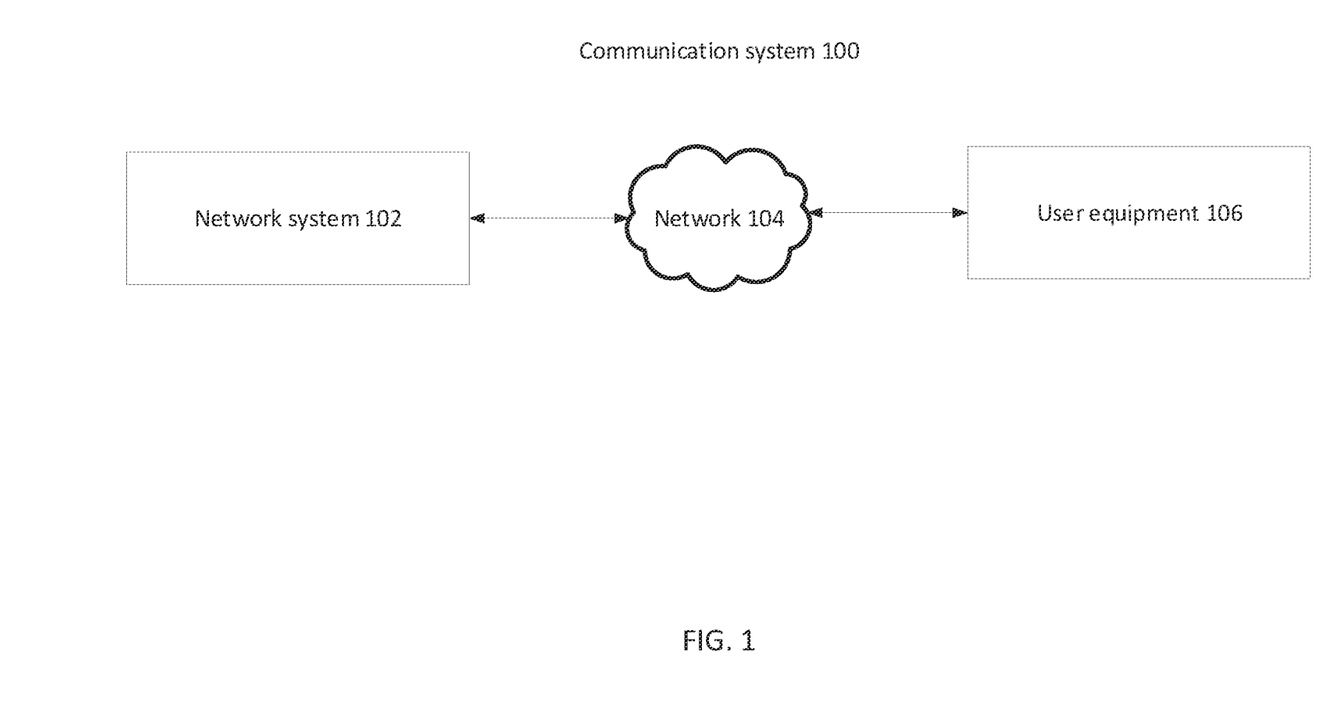
FIG. 1 illustrates an example embodiment of a communication system configured for communications according to the 5G standard.

FIG. 1 illustrates an example embodiment of a communication system 100 configured for communications according to the 5G standard. The communication system 100 includes a network system 102, and network 104, and a UE 106. The techniques described herein may be implemented by the communication system 100, or by one or more components thereof.

The network system 102 may include a g Node B (gNB) device, and may be configured to schedule transmissions between the gNB and the UE, and to communicate with one or more other gNBs. The network system 102 may be a 5G network device. Note that the term "network system" may be used herein to refer to a network device or a plurality of network devices. The network system is not limited to referring to a single physical device, but may also refer to plurality of distributed devices (or components thereof) that perform networking functions.

The network 104 may include, for example, a large area network (LAN), such as a cellular communication network. The UE 106 may include, for example, any device configured to communicate via the network 104 (e.g., a mobile device, a smartphone, a tablet, a desktop, a laptop, a local area network (LAN) device that serves local devices and that connects them the network 104 (such as a router), an internet of things device, or any other appropriate communication device). Note that the term UE is not necessarily limited to a device that is operated by a user, and may refer to devices that operate independent of user control. The UE 106 may be configured to process communications that are transmitted by the network system 102.

Figure 2:
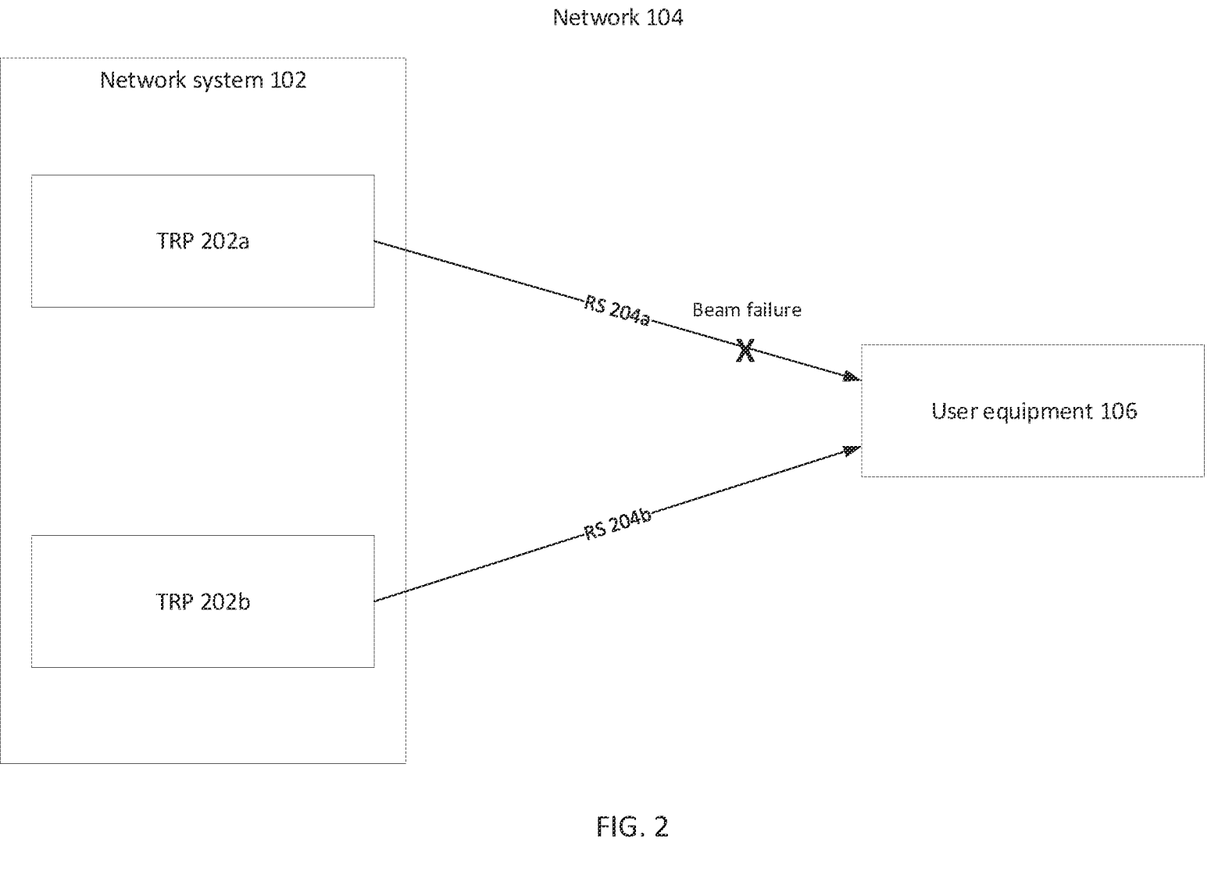
FIG. 2 illustrates an example embodiment of a network system configured for M-TRP transmissions, and shows a beam failure of such a transmission.

FIG. 2 illustrates an example embodiment of the network system 102 configured for M-TRP transmissions, and shows a beam failure of such a transmission. In the depicted example, different antenna ports of one or different channels of the transmission are within multiple TRPs (TRP 202a and TRP 202b), which are non-co-located.

M-TRP transmissions may be categorized into single downlink control information (DCI) and multi-DCI M-TRPs. In single-DCI M-TRP communications, a single physical downlink control channel (PDCCH) is transmitted from one of the TRPs and schedules one or multiple PDSCHs. In one transmission scheme different layers of a single PDSCH are transmitted from different TRPs. In other transmission schemes multiple PDSCHs (multiplexed in time or frequency domain) with the same transport block (TB) are transmitted where all the layers of a PDSCH are transmitted from one of the TRPs. Different PDSCHs among the multiple ones may be transmitted from different TRPs according to a pattern. In multi-DCI M-TRP communications, each TRP transmits its own PDCCH which schedules a PDSCH which is also transmitted from the ports within the same TRP. The example shown in FIG. 2 may pertain to either single-DCI M-TRP or multi-DCI M-TRP.

The following details some protocols for beam failure detection or BFR. The network system 102 may transmit a set of reference signals (RS) 204a from TRP 202a, and may transmit a set of reference signals RS 204b from TRP 202b. RS 204a may include a first subset of one or more RS $q_0(a)$ comprising beam failure detection (BFD) RSs such as one or more channel status information (CSI) RSs, which may be monitored or sampled by the UE 106 and may indicate a failure of a currently active beam from the TRP 202a. The RS 204a may further include a second subset of one or more RS $q_1(a)$ comprising new beam identification (NBI) RSs such as one or more CSI-RS and/or synchronization signal block (SSB) signals, which may be monitored or sampled by the UE 106 and may indicate a strength of one or more alternative candidate beams from the TRP 202a that might be used in a BFR process.

Similarly, the RS 204b may include a first subset of one or more RS $q_0(b)$ comprising BFD CSI-RSs, which may be monitored or sampled by the UE 106 and may indicate a strength of a currently active beam from the TRP 202b. The RS 204b may further include a second subset of one or more RS $q_1(b)$ comprising NBI CSI-RS and/or SSB signals, which may be monitored or sampled by the UE 106 and may indicate a strength of one or more alternative candidate beams from the TRP 202b that might be used in a BFR process.

FIG. 1 depicts a beam failure detected by the UE based on the UE's monitoring or sampling of the RS 204a. Certain embodiments described herein provide for the UE determining that the RS 204a corresponds specifically to the TRP 202a (and not corresponding to the TRP 202b), thus allowing the UE to determine that the beam failure occurred on a beam that corresponds to the TRP 202a (and not the TRP 202b). The UE may thus implement a BFR protocol accordingly (e.g., as described herein).

Certain 5G processes may be improved by the TRP-specific processes described herein. For example, certain 5G processes do not provide for the UE determining which TRP a failed beam correspond to, in an M-TRP scenario. Furthermore, certain 5G processes do not provide for the UE readily selecting a replacement beam that is optimized for the specific failed TRP, in a BFR process. Yet further, certain 5G processes sub-optimally count an insufficient number of beam failure instances (which may be used to detect beam failure). For example, a beam from a first TRP may be associated with RSs that would, on their own, indicate that the beam from the first TRP has failed. However, if RSs associated with the second TRP are strong enough that they would not, on their own, indicate that the beam from the second TRP has failed, the UE might not count such a scenario as a beam failure instance, and beam failure may then sub-optimally not be declared in a scenario where the first beam has failed.

The present disclosure provides for, among other things, improved processes and devices that can ameliorate or solve the above-mentioned potential problems. Certain processes described herein include beam failure detection and/or recovery performed on a per-TRP basis.

Figure 3:
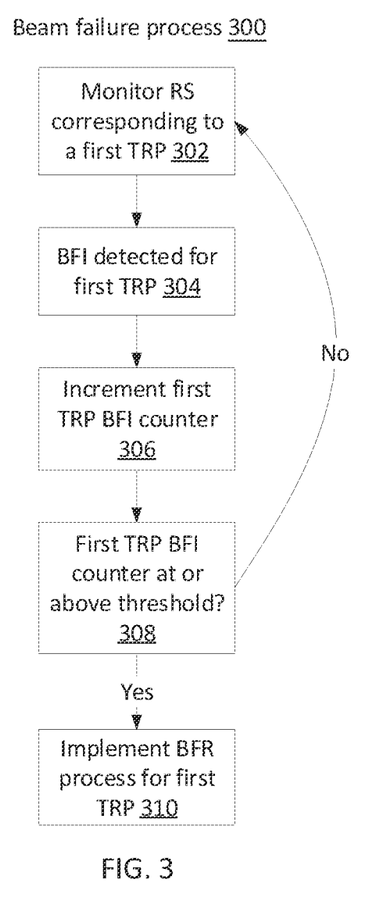
FIG. 3 illustrates an example embodiment of a beam failure process, including beam failure detection and beam failure recovery.

FIG. 3 illustrates an example embodiment of a beam failure process 300 in an M-TRP scenario (e.g., the scenario shown in FIG. 2), including beam failure detection specific to a first TRP (blocks 302-308), and beam failure recovery specific to the first TRP (block 310). For example, the UE 106 may use RS 204a to detect a beam failure of the TRP 202a and to implement BFR for the TRP 202a, or may use RS 204b to detect a beam failure of the TRP 202b and to implement BFR for the TRP 202b, as discussed in more detail below.

In some embodiments, the UE 106 may be configured with a first set of parameters specific to the TRP 202a (e.g., configured by the network system 102). The first set of parameters may include any one or more of periodic CSI-RS resource indices or SSB indices corresponding to the TRP 202a and the RS 204a, a signal power threshold (e.g., a reference signal received power (RSRP) threshold) specific to the TRP 202a, a beam failure instance (BFI) counter threshold specific to the TRP 202a, or a BFI timing window specific to the TRP 202a. The UE 106 may use the first set of parameters in the beam failure process 300 (e.g., as discussed below) to implement beam failure detection and/or BFR specific to the TRP 202a. The UE 106 may be similarly configured with a second set of parameters specific to the TRP 202b. The second set of parameters may include any one or more of periodic CSI-RS resource indices or SSB indices corresponding to the TRP 202b and the RS 204b, a signal power threshold (e.g., a reference signal received power (RSRP) threshold) specific to the TRP 202b, a BFI counter threshold specific to the TRP 202b, or a BFI timing window specific to the TRP 202b. The UE 106 may use the first set of parameters in the beam failure process 300 (e.g., as discussed below) to implement beam failure detection and/or BFR specific to the TRP 202b.

In some embodiments, the UE 106 determines that the RS 204a is specific to TRP 202a, and determines that the RS 204b is specific to the TRP 202b. The UE may determine this via implicit indication of which TRPs the RSs 204a and 204b correspond to, or may determine this via explicit indication, as discussed in more detail below. The UE 106 may make use of this known correspondence in the beam failure process 300, for example.

In some embodiments, the UE may determine that the RS 204a is specific to TRP 202a and that the RS 204b is specific to the TRP 202b by implicit indication as follows. The UE may be configured with a first Core Resource Set (CORESET) corresponding to the TRP 202a, and a second CORESET corresponding to the TRP 202b. The UE 106 may determine that the RS 204a is associated with a first transmission configuration indication (TCI) state corresponding to the first CORESET, and the UE 106 may determine based on this that the RS 204a corresponds to the TRP 202a. Similarly, the UE 106 may determine that the RS 204b is associated with a second transmission configuration indication (TCI) state corresponding to the second CORESET, and the UE 106 may determine based on this that the RS 204b corresponds to the TRP 202b.

In some embodiments, the UE 106 may determine that the RS 204a is specific to TRP 202a and that the RS 204b is specific to the TRP 202b by explicit indication from the network system 102. For example, a gNB of the network system 102 may indicate to the UE 106 (e.g., via radio resource control (RRC) signaling) that the RS 204a is associated with the TRP 202a and/or that the RS 204b is associated with the TRP 202b.

Referring to the example beam failure process 300 shown in FIG. 3, at block 302, the UE 106 monitors the RS 204a (e.g., samples the RS 204a at predetermined timings or on another schedule), which corresponds to the TRP 202a (e.g., is transmitted from the TRP 202a). As discussed above in reference to FIG. 2, the RS 204a may include a first subset of one or more RS $q_0(a)$ comprising BFD RSs such as one or more CSI-RSs, which may be monitored by the UE 106 and may indicate a strength of a currently active beam from the TRP 202a. Monitoring the RS 204a may include determining the respective RSRPs of the one or more CSI-RSs. Monitoring the RS 204a may be performed by the UE 106 based on the periodic CSI-RS resource indices of the first set of parameters corresponding to the TRP 202a.

At block 304, the UE 106 determines that a BFI has occurred for the TRP 202a. In some embodiments, the BFI is determined to have occurred when all the RSRPs of the CSI-RSs of the RS $q_0(a)$ subset are below an RSRP threshold (e.g., the signal power threshold specified by the first set of parameters specific to the TRP 202a). In other embodiments, the BFI may be determined to have occurred if one or more of the RSRPs of the CSI-RSs of the RS $q_0(a)$ subset are below the RSRP threshold. The UE 106 may determine that the BFI corresponds to, or occurred for, the TRP 202a specifically, in response to the BFI being detected based on the RS $q_0(a)$ which are specific to (e.g., transmitted from) the TRP 202a. When the UE 106 determines that the BFI has occurred, the process proceeds to block 306.

At block 306, the UE 106 increments a BFI counter that is specific to the TRP 202a (e.g., which is incremented based on TRP 202a BFIs and not based on TRP 202b BFIs), and the process proceeds to block 308. In some embodiments, the UE 106 is configured with a respective BFI counter for each of the TRPs in the M-TRP scenario (e.g., one BFI counter specific to BFIs of TRP 202a, and one BFI counter specific to BFIs of TRP 202b).

At block 308, the UE 106 determines whether the BFI counter is at or above a BFI counter threshold (e.g., the BFI counter threshold specified in the first set of parameters specific to the TRP 202a). If the BFI counter is not at or above the BFI counter threshold, the process proceeds to block 302, and the UE 106 continues to monitor the RS $q_0(a)$. If the BFI counter is at or above the BFI counter threshold, the UE 106 proceeds to block 310 to implement a BFR process.

In some embodiments, the BFI counter is reset at the end of a BFI timing window or timing period (e.g., the BFI timing window specified by the first set of parameters specific to the TRP 202a). Thus, the UE 106 implements BFR when the BFI counter is incremented to meet or exceed the BFI counter threshold within the timing window (e.g., when a threshold number of BFIs are detected within the timing window). In some embodiments, the UE 106 determines whether the BFI counter is at or above the BFI counter threshold at the expiration of the timing window, and determines whether to proceed to block 302 or to block 310 at that time. In other implementations, as shown in FIG. 3, the UE 106 determines whether the BFI counter is at or above the BFI counter threshold each time the BFI counter is incremented.

At block 310, the UE implements a BFR process. The BFR process may be specific to the particular TRP. Some example embodiments of the BFR process are described herein with respect to FIG. 4.

FIG. 3 shows an embodiment of a beam failure process 300 specific to a particular TRP, which as discussed above, provides for detecting and reporting beam failure and implementing an appropriate BFR procedure. This can, for example, prevent a network from implementing scheduling dependent on a failed TRP, which may in turn improve the network's data throughput. In some implementations, TRP-specific beam failure detection and corresponding TRP-specific BFR may be implemented for both a first TRP and a second TRP (e.g., a first beam failure process 300 may be implemented specifically for the TRP 202a using RS 204a, and a second beam failure process 300 may be implemented specifically for the TRP 202b using RS 204b).

Figure 4:
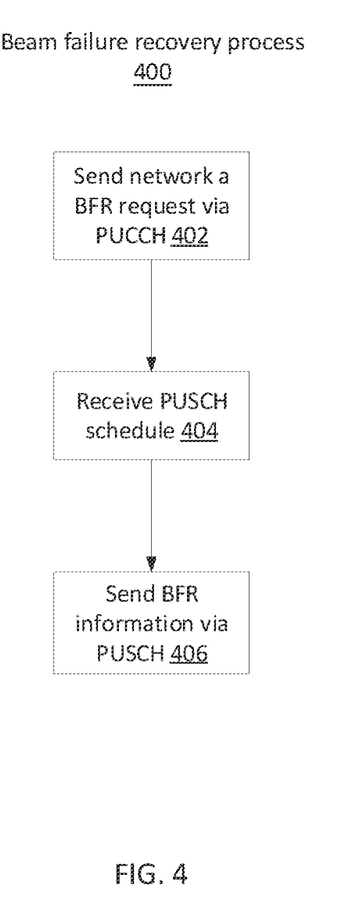
FIG. 4 illustrates an example embodiment of a beam failure recovery process.

Referring now to FIG. 4, FIG. 4 shows an example embodiment of a BFR process 400 that includes sending BFR information via physical uplink control channel (PUCCH). The BFR process 400 may be implemented, for example, in block 310 of FIG. 3. The BFR process 400 may be a BFR process specific to a particular TRP. For example, the BFR process 400 may be implemented by the UE 106 responsive to the UE 106 determining that beam failure has occurred specifically for the TRP 202a (e.g., responsive to the UE 106 determining that beam failure has occurred based on monitoring of RS $q_0(a)$), and the BFR process 400 may select a candidate replacement beam for the using the NBI RSs of the second subset RS $q_1(a)$, which are specific to the TRP 202a. The BFR process 400 may additionally or alternatively be implemented by the UE 106 responsive to the UE 106 determining that beam failure has occurred specifically for the TRP 202b (e.g., responsive to the UE 106 determining that beam failure has occurred based on monitoring of RS $q_0(b)$), and the BFR process 400 may select a candidate replacement beam for the using the NBI RSs of the second subset RS $q_1(b)$, which are specific to the TRP 202b. In this sense, the RS $q_0(a)$) pertaining to the TRP 202a may be said to have a one-to-one association with the RS $q_1(a)$), and the RS $q_0(b)$) pertaining to the TRP 202b may be said to have a one-to-one association with the RS $q_1(b)$). By having such a one-to-one association, BFR may be readily implemented in a manner specific to a TRP.

The BFR process 400 includes, following a determination that a particular TRP (e.g., the TRP 202a) experienced beam failure, the UE 106 sending the network system 102 a BFR request via PUCCH at block 402. The BFR request may include a scheduling request (SR) on a PUCCH resource carrying a link recovery request (LRR). The UE 106 may be configured for the PUCCH transmission via RRC. The configuration may include a first configuration specific to the TRP 202a whereby the BFR request may be sent to the TRP 202a, and a second configuration to specific to the TRP 202b whereby the BFR request may be sent to the TRP 202b. Using the appropriate configuration, the UE 106 may send the BFR request to one of the TRP 202a and TRP 202b for which beam failure was not detected. For example, if a beam failure specific to TRP 202a was detected, the UE 106 may responsively send the BFR request to the TRP 202b. This helps to assure that the BFR request is received by the network system 102. In an alternative embodiment, a common configuration may be implemented in which single designated on of the TRPs receives the SR, and transfers relevant information to the other TRP. In another alternative embodiment, the UE may attempt to send the SR to both TRPs.

At block 404, the UE 106 receives, from the network system 102, a physical uplink shared channel (PUSCH) schedule via PDCCH. The PUSCH schedule may indicate a media access control (MAC) control element (CE) PUSCH that the UE may use to transmit BFR information.

At block 406, the UE 106 sends BFR information to the network system 102 via PUSCH transmission, according to the schedule received at block 404. The PUSCH transmission may be a MAC CE PUSCH transmission. The BFR information may include information specific to the TRP 202a and/or the TRP 202b, and may include, for example, the indices of SCells with detected beam failure (e.g., SCells for which beam failure was detected based on corresponding one or more of the RS $q_0(a)$) or the RS $q_0(b)$), indication of presence of $q_{new}$ for the corresponding SCells, and index of $q_{new}$ for the corresponding SCells (e.g., new candidate beams selected based on corresponding RS $q_1(a)$) or RS $q_1(b)$).

Although the BFR process 400 involves the UE 106 sending the network system 102 BFR information via PUCCH, the BFR process may be implemented in other suitable ways. For example, the UE 106 may perform a random-access channel (RACH) procedure. This may involve the UE 106 performing the RACH procedure for BFR specifically for the TRP 202a according to a selected RS index from those indices in the set RS $q_1(a)$ whose RSRP values are above the relevant threshold (e.g., a threshold specific to the TRP 202a). In some embodiments, the RACH configuration for BFR may be a single configuration while certain RACH occasions (ROs) and certain physical random access channel (PRACH) preambles are linked to each of RS $q_1(a)$ and RS $q_1(b)$. Using this protocol, the TRP 202a and the TRP 202b may each receive an intended PRACH transmission corresponding the appropriate one of RS $q_1(a)$ and RS $q_1(b)$. In some embodiments, such single RACH configuration may involve tight coordination between TRPs which may not be readily achieved. As an alternative then, separate RACH configurations linked with each of RS $q_1(a)$ and RS $q_1(b)$ may be utilized.

Some additional example embodiments are described below.

In some embodiments, no selection decoding/soft combining of a failed TRP candidate may be implemented with repeated PDCCH. In such embodiments, if the UE 106 reports beam failure to a higher layer and before completion of BFR, if the UE 106 is configured to receive PDCCHs which are repeated in same or multiple synchronization signal (SS) sets, the UE 106 monitors the PDCCHs among linked candidates using the following process. If a set A of PDCCH candidates are linked to a set B, and the set A is associated with a TRP that experienced beam failure, the UE 106 does not monitor the PDCCH candidates in the set A. The UE does not perform soft-combining, and monitors the candidates in set B. A similar technique may be applied to the reception of repeated PDSCHs.

In some embodiments, no selection decoding/soft combining of the failed TRP candidate may be implemented using multi-chance PDCCH. In such embodiments, if the UE 106 reports beam failure to a higher layer and before completion of BFR, if the UE 106 is configured to receive PDCCHs which are transmitted in a multi-chance scheme in same or multiple SS sets, the UE 106 monitors the PDCCHs among the candidates using the following process. If a set of PDCCH candidates are associated with a TRP that experienced beam failure, the UE does not monitor the PDCCH candidates. A similar technique may be applied to the reception of repeated PDSCHs.

In some embodiments, no selection decoding/soft combining of the failed TRP candidate may be implemented using certain PDSCH schemes. In such embodiments, if the UE 106 reports beam failure to a higher layer and before completion of BFR, if the UE 106 is configured to receive multi-TRP PDSCH, the UE receives the PDCCHs using the following process. If the PDSCH transmission scheme is single DCI, the UE 106 does not receive the PDSCH occasion with the TCI state associated with the failed TRP. If the PDSCH transmission scheme is such that a single PDSCH occasion is associated with two TRPs with two different TCI states, the UE 106 is not expected to the receive the PDSCH, perform channel estimation and demodulation on the set of REs (RBs) or resources which are transmitted with the TCI state of the failed TRP.

If the PDSCH transmission scheme is multi-DCI, the UE 106 does not receive the PDSCH occasion with the TCI state associated with the failed TRP. The association of the TCI states to the TRPs may be according to the value of CORSETPoolIndex of the CORSET scheduling the PDSCH.

A similar behavior may be defined when the UE 106 transmits PUSCH/PUCCH with two different TCI states. In such a scenario, the UE 106 is not expected to transmit the PUSCH/PUCCH which are associated with the failed TRP.

Figure 5:
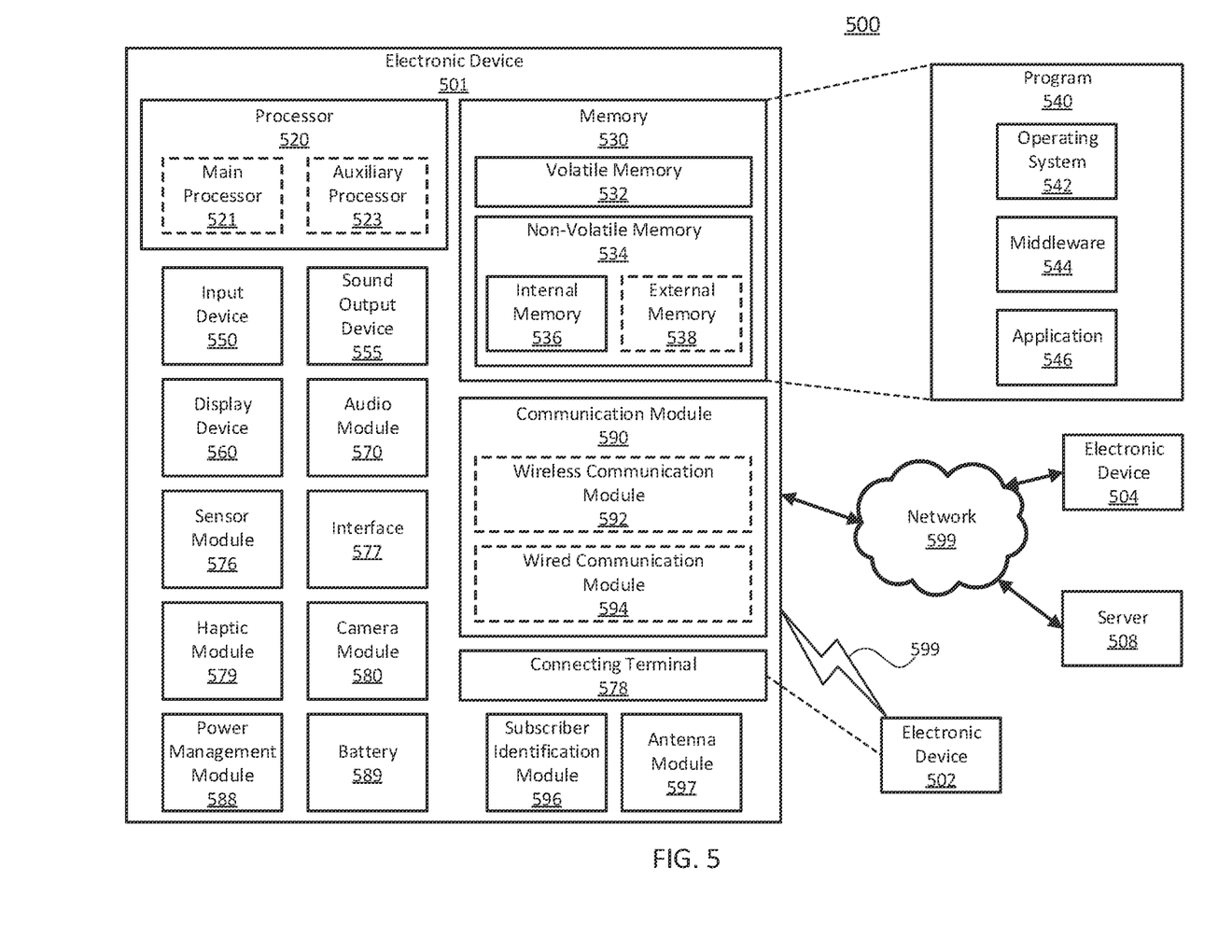
FIG. 5 illustrates an example embodiment of a system configured to manage M-TRP beam failure reporting and/or beam failure recovery.

FIG. 5 shows an example of a system 500 configured to manage M-TRP beam failure reporting and/or beam failure recovery, according to some embodiments. Referring to FIG. 5, the electronic device 501 (which may be similar to, or the same as, the UE 106) in the system 500 may communicate with an electronic device 502 via a first network 598 (e.g., a short-range wireless communication network, such as a Wi-Fi network), or an electronic device 504 or a server 508 (which may be similar to, or the same as, the network system 102) via a second network 599 (which may be similar to, or the same as, the network 104), such as a long-range wireless communication network (e.g., a cellular communication network, such as a 5G network). The electronic device 501 may communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, and/or an antenna module 597. In one embodiment, at least one of the components (e.g., the display device 560 or the camera module 580) may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display), or the display device 560 may include one or more sensors in addition to the sensor module 576.

In some embodiments, the electronic device 501 may include a computing device or processor configured to implement M-TRP beam failure reporting and/or beam failure recovery, such as the methods of managing M-TRP beam failure reporting and/or beam failure recovery described herein.

The processor 520 may execute, for example, software (e.g., a program 540) to control at least one other component (e.g., a hardware or a software component) of the electronic device 501 coupled with the processor 520, and may perform various data processing and/or computations. As at least a part of the data processing and/or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, and/or execute a particular function. The auxiliary processor 523 may be implemented as being separate from, or as a part of, the main processor 521.

The auxiliary processor 523 may control at least some of the functions or states related to at least one component (e.g., the display device 560, the sensor module 576, or the communication module 590) from among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an image signal processor or a communication processor) may be implemented as a part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 and/or the non-volatile memory 534.

The program 540 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, and/or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or as a part of, the speaker.

The display device 560 may visually provide information to the outside (e.g., a user) of the electronic device 501. The display device 560 may include, for example, a display, a hologram device, and/or a projector and control circuitry to control a corresponding one of the display, the hologram device, and the projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, and/or output the sound via the sound output device 555 or a headphone of an external electronic device 502 directly (e.g., wired) or wirelessly coupled with the electronic device 701.

The sensor module 576 may detect an operational state (e.g., power or temperature) of the electronic device 501 and/or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, and/or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, and/or an audio connector (e.g., a headphone connector).

The haptic module 579 may convert an electrical signal into a mechanical stimulus (e.g., a vibration or a movement) and/or an electrical stimulus which may be recognized by a user via tactile sensation or kinesthetic sensation. According to one embodiment, the haptic module 579 may include, for example, a motor, a piezoelectric element, and/or an electrical stimulator.

The camera module 580 may capture a still image or moving images. According to one embodiment, the camera module 580 may include one or more lenses, image sensors, image signal processors, and/or flashes.

The power management module 588 may manage power supplied to the electronic device 501. The power management module 588 may be implemented as at least a part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, and/or a fuel cell.

The communication module 590 may support establishing a direct (e.g., wired) communication channel or a wireless communication channel between the electronic device 501 and the external electronic device (e.g., the electronic device 502, the electronic device 504, and/or the server 508) and performing communication via the established communication channel. The communication module 590 may include one or more communication processors that are operable independently from the processor 520 (e.g., the AP) and may support a direct (e.g., wired) communication and/or a wireless communication. According to one embodiment, the communication module 590 may include a wireless communication module 592 (e.g., a cellular communication module, a short-range wireless communication module, and/or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth®, wireless-fidelity (Wi-Fi) direct, and/or a standard of the Infrared Data Association (IrDA)) or the second network 599 (e.g., a long-range communication network, such as a cellular network, the Internet, and/or a computer network (e.g., LAN or wide area network (WAN)). Bluetooth® is a registered trademark of Bluetooth SIG, Inc., Kirkland, WA These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit and/or receive a signal and/or power to and/or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 and/or the second network 599, may be selected, for example, by the communication module 590 (e.g., the wireless communication module 592). The signal and/or the power may then be transmitted and/or received between the communication module 590 and the external electronic device via the selected at least one antenna.

At least some of the above-described components may be mutually coupled and communicate signals (e.g., commands and/or data) therebetween via an inter-peripheral communication scheme (e.g., a bus, a general purpose input and output (GPIO), a serial peripheral interface (SPI), and/or a mobile industry processor interface (MIPI)).

According to one embodiment, commands and/or data may be transmitted and/or received between the electronic device 501 and the external electronic device 504 via the server 508 coupled with the second network 599. Each of the electronic devices 502 and 504 may be a device of a same type as, or a different type from, the electronic device 501. All or some of operations to be executed at or by the electronic device 501 may be executed at one or more of the external electronic devices 502, 504, or the server 508. For example, if the electronic device 501 should perform a function and/or a service automatically, or in response to a request from a user or another device, the electronic device 501, instead of, or in addition to, executing the function and/or the service, may request the one or more external electronic devices to perform at least a part of the function and/or the service. The one or more external electronic devices receiving the request may perform the at least a part of the function and/or the service requested, and/or an additional function and/or an additional service related to the request, and transfer an outcome of the performing to the electronic device 501. The electronic device 501 may provide the outcome, with or without further processing of the outcome, as at least a part of a reply to the request. To that end, a cloud computing, distributed computing, and/or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Herein, embodiments of the present disclosure are described in detail with reference to the accompanying drawings. It should be noted that same or similar elements may be designated by the same reference numerals/letters even though they are shown in different drawings. In the description herein, specific details such as detailed configurations and components are provided to assist with the overall understanding of the embodiments of the present disclosure. Various changes and modifications of the embodiments described herein may be made without departing from the scope of the present disclosure. Certain detailed descriptions may be omitted for clarity and conciseness.

The present disclosure provides for various modifications and various embodiments. It should be understood that the present disclosure is not limited to the various embodiments explicitly described or detailed herein, and that the present disclosure includes modifications, equivalents, and alternatives within the scope of the present disclosure.

Although terms including an ordinal number such as first, second, etc., may be used for describing various elements, the elements are not restricted by such terms. Such terms are used to distinguish one element from another element, and do not imply any specific ordering. As used herein, the term "and/or" includes any and all combinations of one or more associated items. Singular forms are intended to include plural forms unless the context clearly indicates otherwise. In the present disclosure, it should be understood that the terms "include" or "have" indicate the existence of a feature, a number, a step, an operation, a structural element, a part, or a combination thereof, and do not exclude the existence or probability of the addition of one or more other features, numbers, steps, operations, structural elements, parts, or combinations thereof.

According to one embodiment, at least one component (e.g., a manager, a set of processor-executable instructions, a program, or a module) of the above-described components may include a single entity or multiple entities. One or more of the above-described components may be omitted, or one or more other components may be added. Alternatively or additionally, a plurality of components (e.g., a manager, a set of processor-executable instructions, a program, or a module) may be integrated into a single component. In this case, the integrated component may still perform one or more functions of each of the plurality of components in the same or similar manner as they are performed by a corresponding one of the plurality of components before the integration. Operations performed by the manager, the set of processor-executable instructions, the program, the module, or another component may be carried out sequentially, in parallel, repeatedly, or heuristically, or one or more of the operations may be executed in a different order or omitted, or one or more other operations may be added.

While certain references are made herein to the 3GPP 5G specification, the techniques disclosed herein may be applied to or extended to other specifications, including cellular specifications (whether 3GPP or otherwise), such as the 3GPP 4G or LTE specification, any cellular specification that follows 5G (e.g., a 6G specification).

What is claimed is:

1. A method of implementing beam failure recovery (BFR) for a multi-transmission-and-reception-point (M-TRP) transmission comprising a first transmission from a first TRP and a second transmission from a second TRP, the method comprising:
   receiving, by a user equipment (UE), a first set of reference signals (RSs) corresponding to the first TRP and a second set of RSs corresponding to the second TRP, the first set of reference signals corresponding to the first TRP including a first subset of reference signals and a second subset of reference signals;
   determining, by the UE, that the first set of RSs indicates a beam failure instance (BFI) specific to the first TRP, and responsively updating a first BFI counter specific to the first TRP based on the first subset of reference signals;
   determining, by UE, that a beam failure with respect to the first TRP has occurred based on a count of the first BFI counter equaling or surpassing a first BFI counter threshold;
   selecting a candidate replacement beam from the second subset of reference signals; and
   performing, by the UE, a BFR process for the first TRP based on the candidate replacement beam, responsive to determining that the beam failure with respect to the first TRP has occurred.

2. The method of claim 1, further comprising:
   determining, by the UE, that the second set of RSs indicates a beam failure instance specific to the second TRP, and responsively updating a second BFI counter specific to the second TRP;
   determining, by UE, that a beam failure with respect to the second TRP has occurred based on a count of the second BFI counter equaling or surpassing a second threshold; and
   performing, by the UE, a BFR process for the second TRP responsive to determining that the beam failure with respect to the second TRP has occurred.

3. The method of claim 1, wherein:
   the UE is configured with a first CORESET corresponding to the first TRP and a second CORESET corresponding to the second TRP, and
   determining that the first set of RSs indicates the beam failure instance specific to the first TRP comprises determining that the first set of RSs are associated with a first transmission configuration indication (TCI) state corresponding to the first CORESET.

4. The method of claim 1, wherein the UE is configured with a first set of parameters of periodic CSI-RS resource indices or SSB indices corresponding to the first set of RSs, and a second set of parameters of periodic CSI-RS resource indices or SSB indices corresponding to the second set of RSs.

5. The method of claim 4, wherein:
   the first set of parameters further comprises the first BFI counter threshold specific to the first TRP, a first signal power threshold specific to the first TRP, or a BFI timing window in which beam failure instances are counted specific to the first TRP, and
   the second set of parameters further comprises a second BFI counter threshold specific to the second TRP, a second signal power threshold specific to the second TRP, or a BFI timing window in which BFIs are counted specific to the second TRP.

6. The method of claim 1, further comprising:
   receiving, by the UE from a network system, an explicit indication that the first set of RSs correspond to the first TRP and the second set of RSs correspond to the second TRP.

7. The method of claim 6, further comprising:
   receiving, by the UE from the network system, a first configuration for a physical uplink control channel (PUCCH) transmission with a link recovery request (LRR) specific to the first TRP, and a second configuration for a PUCCH transmission with an LRR specific to the second TRP, wherein the first configuration differs from the second configuration,
   wherein performing the BFR process for the first TRP comprises implementing the PUCCH transmission with the LRR specific to the first TRP according to the first configuration.

8. The method of claim 7, further comprising:
   receiving, by the UE from the network system, a configuration for a physical uplink control channel (PUCCH) transmission with a link recovery request (LRR) for BFR processes for both the first TRP and the second TRP, wherein the configuration specifies transmitting the LRR to one of the first TRP or the second TRP.

9. The method of claim 7, further comprising the UE transmitting a physical uplink shared channel (PUSCH) media access control (MAC) control element (CE) that comprises information specific to the first TRP or the second TRP.

10. The method of claim 1, wherein the BFR process includes a random-access channel (RACH) process.

11. A system, comprising:
   a user equipment (UE) comprising a processing circuit,
   wherein the processing circuit is configured to implement a method of beam failure recovery (BFR) for a multi-transmission-and-reception-point (M-TRP) transmission comprising a first transmission from a first TRP and a second transmission from a second TRP, the method comprising:

receiving a first set of reference signals (RSs) corresponding to the first TRP and a second set of RSs corresponding to the second TRP, the first set of reference signals corresponding to the first TRP including a first subset of reference signals and a second subset of reference signals;

determining that the first set of RSs indicates a beam failure instance (BFI) specific to the first TRP, and responsively updating a first BFI counter specific to the first TRP based on the first subset of reference signals;

determining that a beam failure with respect to the first TRP has occurred based on a count of the first BFI counter equaling or surpassing a first BFI counter threshold;

selecting a candidate replacement beam from the second subset of reference signals; and performing a BFR process for the first TRP based on the candidate replacement beam, responsive to determining that the beam failure with respect to the first TRP has occurred.

12. The system of claim 11, wherein the method of BFR for the M-TRP transmission that the processing circuit is configured to implement further comprises:

determining that the second set of RSs indicates a beam failure instance specific to the second TRP, and responsively updating a second BFI counter specific to the second TRP;

determining that a beam failure with respect to the second TRP has occurred based on a count of the second BFI counter equaling or surpassing a second threshold; and performing a BFR process for the second TRP responsive to determining that the beam failure with respect to the second TRP has occurred.

13. The system of claim 11, wherein:

the UE is configured with a first CORESET corresponding to the first TRP and a second CORESET corresponding to the second TRP, and determining that the first set of RSs indicates the beam failure instance specific to the first TRP comprises determining that the first set of RSs are associated with a first transmission configuration indication (TCI) state corresponding to the first CORESET.

14. The system of claim 11, wherein the UE is configured with a first set of parameters of periodic CSI-RS resource indices or SSB indices corresponding to the first set of RSs, and a second set of parameters of periodic CSI-RS resource indices or SSB indices corresponding to the second set of RSs.

15. The system of claim 14, wherein:

the first set of parameters further comprises the first BFI counter threshold specific to the first TRP, a first signal power threshold specific to the first TRP, or a BFI timing window in which beam failure instances are counted specific to the first TRP, and the second set of parameters further comprises a second BFI counter threshold specific to the second TRP, a second signal power threshold specific to the second TRP, or a BFI timing window in which BFIs are counted specific to the second TRP.

16. The system of claim 11, wherein the method of BFR for the M-TRP transmission that the processing circuit is configured to implement further comprises:

receiving, from a network system, an explicit indication that the first set of RSs correspond to the first TRP and the second set of RSs correspond to the second TRP.

17. The system of claim 16, wherein the method of BFR for the M-TRP transmission that the processing circuit is configured to implement further comprises:

receiving, from the network system, a first configuration for a physical uplink control channel (PUCCH) transmission with a link recovery request (LRR) specific to the first TRP, and a second configuration for a PUCCH transmission with an LRR specific to the second TRP, wherein the first configuration differs from the second configuration, wherein performing the BFR process for the first TRP comprises implementing the PUCCH transmission with the LRR specific to the first TRP according to the first configuration.

18. The system of claim 17, wherein the method of BFR for the M-TRP transmission that the processing circuit is configured to implement further comprises:

receiving, from the network system, a configuration for a physical uplink control channel (PUCCH) transmission with a link recovery request (LRR) for BFR processes for both the first TRP and the second TRP, wherein the configuration specifies transmitting the LRR to one of the first TRP or the second TRP.

19. The system of claim 17, wherein the method of BFR for the M-TRP transmission that the processing circuit is configured to implement further comprises the UE transmitting a physical uplink shared channel (PUSCH) media access control (MAC) control element (CE) that comprises information specific to the first TRP or the second TRP.

20. The system of claim 11, wherein the BFR process includes a random-access channel (RACH) process.

* * * * *